(12) United States Patent
Zorn et al.

(10) Patent No.: US 9,173,409 B2
(45) Date of Patent: Nov. 3, 2015

(54) SUPPORT PLATE DEVICE FOR BAKED GOODS

(71) Applicant: MECATHERM, Barembach (FR)

(72) Inventors: Bernard Zorn, Saverne (FR); Olivier Sargent, Angers (FR)

(73) Assignee: MECATHERM, Barembach (FR)

( * ) Notice: Subject to any disclaimer, the term of this patent is extended or adjusted under 35 U.S.C. 154(b) by 0 days.

(21) Appl. No.: 14/379,737

(22) PCT Filed: Feb. 26, 2013

(86) PCT No.: PCT/FR2013/050386
§ 371 (c)(1),
(2) Date: Aug. 19, 2014

(87) PCT Pub. No.: WO2013/128107
PCT Pub. Date: Sep. 6, 2013

(65) Prior Publication Data
US 2015/0037451 A1  Feb. 5, 2015

(30) Foreign Application Priority Data

Feb. 29, 2012  (FR) ...................................... 12 51868
Jul. 9, 2012  (FR) ...................................... 12 56582

(51) Int. Cl.
*A21B 3/13* (2006.01)

(52) U.S. Cl.
CPC . *A21B 3/13* (2013.01); *A21B 3/132* (2013.01); *A21B 3/135* (2013.01)

(58) Field of Classification Search
CPC .......... B29C 43/00; B29C 33/20; A21B 3/13; A21B 3/132; A21B 3/135
USPC ............. 425/453–454, 352–355, 357, 451.9, 425/470; 249/120–121; 269/316–319
See application file for complete search history.

(56) References Cited

U.S. PATENT DOCUMENTS

| | | | |
|---|---|---|---|
| 3,746,837 A | | 7/1973 | Frey et al. |
| 3,943,602 A | * | 3/1976 | Siclari ........................... 425/338 |
| 4,032,276 A | * | 6/1977 | Mercer ......................... 425/123 |
| 4,646,500 A | * | 3/1987 | Smith ......................... 52/506.03 |
| 4,734,047 A | * | 3/1988 | Krumme ....................... 439/161 |
| 5,345,963 A | * | 9/1994 | Dietiker .......................... 137/12 |
| 7,247,011 B2 | * | 7/2007 | St. Germain et al. ........... 425/87 |
| D660,662 S | * | 5/2012 | Davison et al. ................ D7/674 |
| 2013/0200081 A1 | * | 8/2013 | Wilkinson .................. 220/573.1 |
| 2014/0161951 A1 | * | 6/2014 | Evseev ........................... 426/498 |
| 2014/0183318 A1 | * | 7/2014 | Treske et al. ............. 248/346.01 |

FOREIGN PATENT DOCUMENTS

| | | |
|---|---|---|
| DE | 29708638 U1 | 7/1997 |
| DE | 19905221 A1 | 8/2000 |

(Continued)

*Primary Examiner* — Nahida Sultana
(74) *Attorney, Agent, or Firm* — Andrew W. Chu; Craft Chu PLLC

(57) ABSTRACT

The support plate device for baked goods, pastries, or Viennese baked goods, includes at least one lower plate and at least two molds supported by the lower plate. The device further includes at least one upper plate, which covers the molds. The lower surface of the upper plate engages with the upper ends of the respective edges of the molds. There is a resilient return device for each mold, generating a force urging each mold individually and separately against the lower surface of the upper plate.

6 Claims, 2 Drawing Sheets

(56) References Cited

FOREIGN PATENT DOCUMENTS

| DE | 19959465 | A1 | 6/2001 |
|----|----------|----|--------|
| EP | 0878130 | A1 | 11/1998 |
| FR | 2682262 | A1 | 4/1993 |
| WO | 9524128 | A1 | 9/1995 |

\* cited by examiner

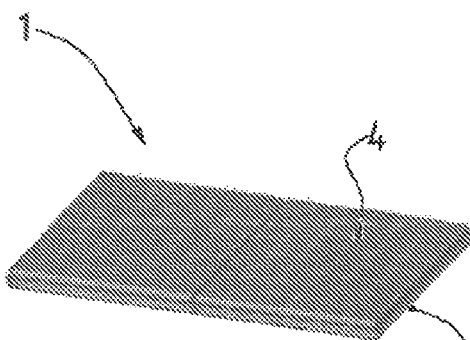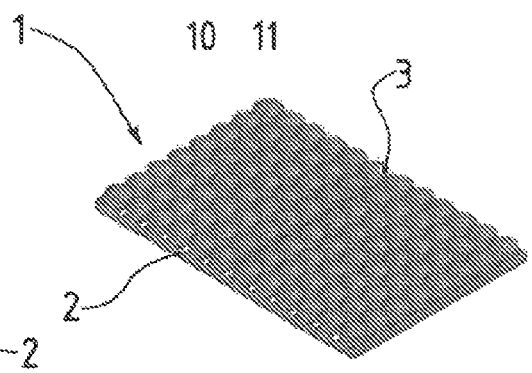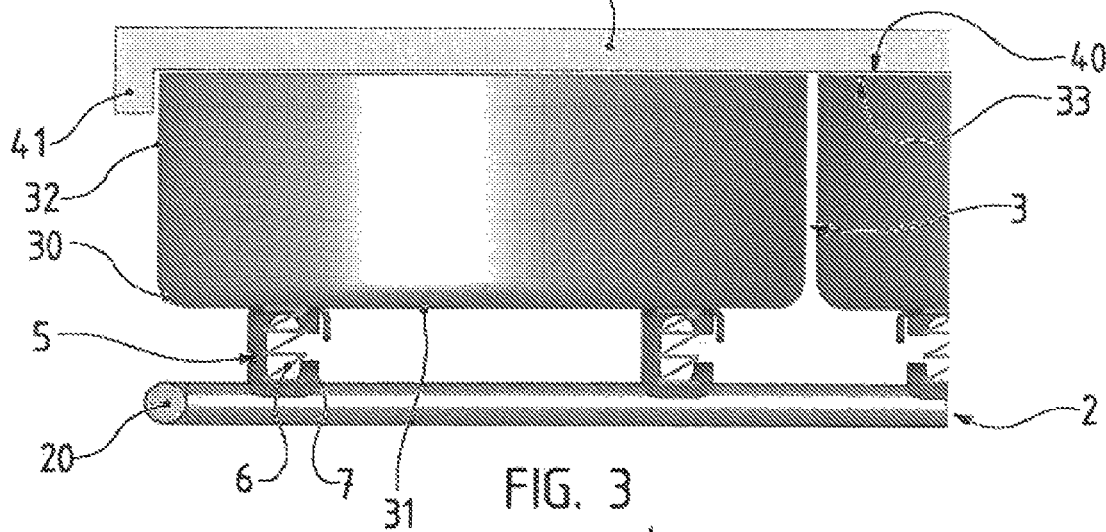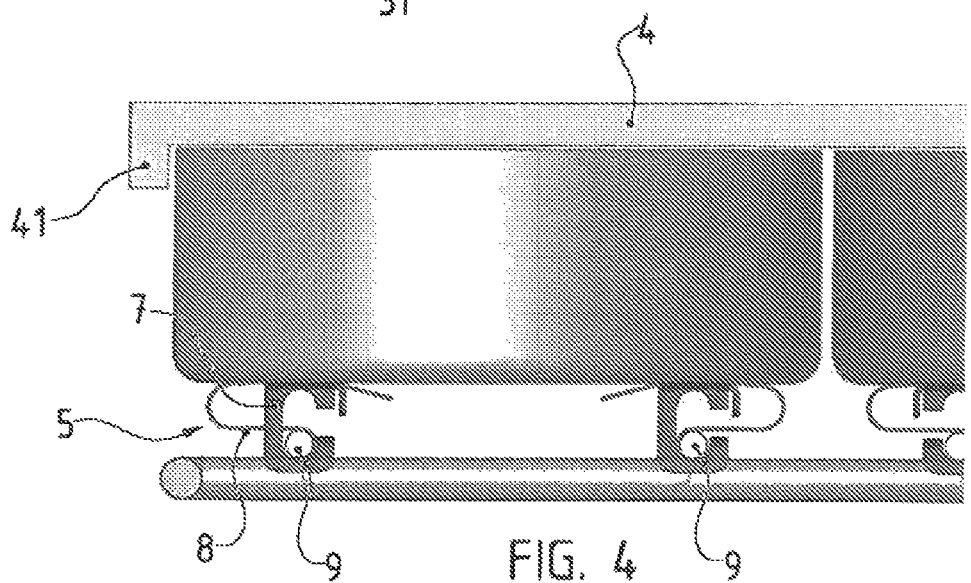

SUPPORT PLATE DEVICE FOR BAKED GOODS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to a support plate device for baked goods, pastries, or Viennese baked goods.

The present invention will find its application in the field of utensils and equipment for the production of baked goods, pastries, or Viennese baked goods or the like. It will find a very particular interest in the field of the plates used for conveying these products through various processing units, in particular during the stages of fermentation and baking.

In the field of bakery, the dough is subjected to a step of dividing into dough pieces, then of shaping of the latter, which are then deposited onto plates or into molds, used for transporting them, especially through a fermentation step and passing through the oven.

2. Description of Related Art Including Information Disclosed Under 37 CFR 1.97 and 37 CFR 1.98.

In particular, many products should preserve a well-determined specific shape during fermentation and during baking. To this end, they are placed inside molds having said desired shape at the level of the bottom and the periphery.

However, the molds are open in the upper portion, in order to permit their supply with dough pieces and the extraction of the products after baking. Therefore, the dough piece swells or "raises" during fermentation and baking, changing the upper aspect of the finished product.

In order to cope with this drawback, each mold is closed at the upper portion.

Examples of such a closing and locking of the cover of one single mold are disclosed in WO 95/24128 or DE 199 59 465. Such a locking can also be applied by one single cover on several molds at one time, namely as described in DE 297 08 638 or FR 2 682 262.

In addition, a springy restoring force can be applied from the top to the bottom, in order to maintain a downward pressure of the cover on all the molds at the same time.

In this framework, within the lines of industrial bakeries, it is customary to use "teams" of molds, which permit to convey a number of molds on one single support plate. Therefore, one single plate is applied for covering several molds at the same time, resting on the upper edges of said molds. Thus, the molds being closed, the upper swelling of the dough piece during its fermentation and its baking is continuous and limited.

But such a technique does not ensure the tightness and, after fermentation or baking, dough overflows are observed at the upper periphery of the product, which no longer has the desired shape and quality. These overflows are due to the fact that the upper rims of the edges of said molds are not completely joined to the plate. In brief, the tops of the molds are not all coplanar with each other, thus creating differences of level through which the dough escapes during fermentation or baking.

In order to cope with this problem, the solution currently used is to maintain the covering plate on the support plate resting on the molds, by applying a force suitable for pressing the upper surface of said covering plate against the upper edges of the molds. To this end, complex mechanical locking and clamping means are provided on both support and covering plates for applying at a plurality of points a force for clamping said plates to each other. The deformation and mechanical stresses so applied to the plates are supposed to ensure the tightness between the molds and said covering plate.

Again, burrs are after all observed, which are due to the fact that the upper edges of the molds are not co-planar and do not perfectly apply against the lower face of the covering plate. In addition, the mechanical and thermal stresses the molds and the plates are subjected to lead to deformations of the constituent materials during baking. Thus, the dough infiltrates through the smallest gaps, which are formed, despite the overall clamping force exerted between the plates.

In addition, the locking means are subjected to expansion during heating, which makes the separation of the plates difficult after baking. Finally, such means are expensive and of a high maintenance cost.

SUMMARY OF THE INVENTION

The present invention is aimed at coping with the drawbacks of the state of the art by providing an individualized maintenance of the plate covering the molds, ensuring that the upper rims of the edges of said molds are maintained into contact with the lower face of the covering plate. To this end, the invention provides for locally applying a springy restoring force on each mold, rather than on the two plates between them.

Thus, the invention relates to a support plate device for baked goods, pastries, or Viennese baked goods, comprising at least one bottom plate and at least two molds supported by said bottom plate, said device comprising also at least one top plate covering said molds, its lower surface entering into contact with the upper rims of their respective edges, wherein it comprises means for springy restoring each mold by a force pushing individually and independently each mold against the lower surface of the upper plate.

Therefore, the invention applies a vertical force from the bottom up for each mold independently from each other aimed at pressing the upper surface of each mold against the lower surface of the covering plate. In brief, several forces are applied and each force pushes each mold in a different and dedicated way from the bottom plate against the top plate. Thus, each force is dedicated to the fermentation and baking of a product.

In addition, the springy restoring means implemented under each mold, on the one hand, ensure an articulation generating a freedom of movement that permits to adapt the area of contact of the upper rims of the edges of each mold with said bottom surface, depending on the co-planarity of the rims of the mold with the lower surface of covering plate and, on the other hand, permit to apply a dedicated force to each product capable of maintaining the applying against the bottom surface of said covering plate during the swelling of the latter.

According to further additional features, said springy restoring means comprise a hinged connection with each mold, so as to ensure at least one degree of freedom of movement for said mold, preferably at least three degrees of freedom. In particular, the restoring means can themselves constitute said hinged connection permitting, on the one hand, a vertical translation and, on the other hand, displacements in pivoting about at least two axes in a plane oscillating with respect to the plane of the lower plate.

According to a first embodiment, said springy restoring means are in the form of at least one compression spring.

According to another embodiment, said springy restoring means are in the form of at least one flexible blade made of a material with shape memory.

Preferably, said upper covering plate can have a mass the weight of which is at least higher than the total sum of the forces of said springy restoring means.

In particular, said device can comprise means for quick locking of said upper covering plate with said lower support plate. In addition, these locking means ensure the stability of the device during its transportation.

Moreover, the solution thus implemented greatly simplifies the operation of covering molds before fermentation and opening after baking. Indeed, the weight only of the covering plate, which acts as a cover, can be sufficient to guarantee a vertical downward force that ensures the compression of the springy restoring means of all the molds, inclusive of the lowest mold. The weight of this cover and the restoring force are related to each other, in order to provide the minimum force required to fight the raising of the product during fermentation and during cooking.

Furthermore, the invention can thus omit the complex means for locking the plates to each other. They may however be maintained and are then greatly simplified, permitting a locking in the form of quick couplings simply dedicated to keeping the plates together, without requiring to apply a force, since the springy restoring means are in charge of same.

Further features and advantages of the invention will become clear from the following detailed description of non-restrictive embodiments of the invention, with reference to the attached figures.

BRIEF DESCRIPTION OF THE DRAWINGS

FIG. 1 shows a perspective view of an exemplary embodiment of a device according to the invention in closed configuration.

FIG. 2 shows a perspective view similar to FIG. 1 of said device in open configuration.

FIG. 3 is a vertical cross-sectional view of the detail of the springy restoring means according to a first embodiment.

FIG. 4 shows a vertical cross-sectional view of the springy restoring means according to another embodiment.

DETAILED DESCRIPTION OF THE DRAWINGS

Figure 5:
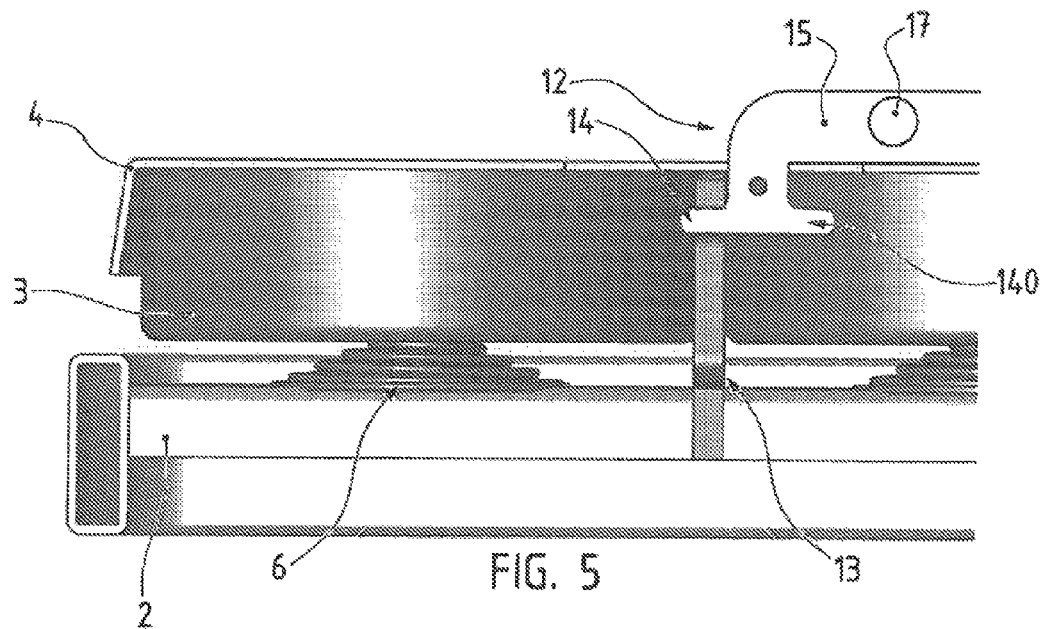
FIG. 5 shows a vertical cross-sectional view of the springy restoring means according to yet another embodiment.

The present invention relates to a support plate device 1 for baked goods, pastries, or Viennese baked goods.

Such a device 1 comprises at least a bottom plate 2 and at least two molds 3, preferably several rows and columns of molds 3, supported by said bottom plate 2 or by suitable supporting means.

Such a plate 2 can have a general shape in the form of a rectangular parallelepiped, provided or not on its periphery with a frame 20 improving its rigidity.

Preferably, as visible in FIG. 2, several molds 3 are arranged regularly on the surface of said plate 2, in columns and rows.

It should be noted that each mold 3 is aimed at receiving a dough piece during the steps of fermentation and baking. Therefore, each mold 3 can have a shape adapted to the shape of the final product to be obtained. According to the exemplary embodiment shown and described, but in no way restrictively, said molds 3 are in the shape of cylindrical cups having a circular cross-section and having a rounded rim 30 between the base 31 forming the bottom and the peripheral edge 32. It should be noted that said molds can have other shapes, polygonal shapes, in the form of a rectangular parallelepiped, star-shaped or similar. The surface opposite the bottom is designed open for inserting the dough pieces and extracting the finished products after baking.

Moreover, said device 1 also comprises at least one upper plate 4 covering said molds 3, its lower surface 40 entering into contact with the upper rims 33 of their respective edges. In brief, the plate 4 is simply placed on top of the molds 3 and forms a cover, made of one or several panels.

Advantageously, the device 1 comprises springy restoring means 5 for each mold 3 with at least a force that is applied from the bottom upward. In brief, the forces exerted by said restoring means 5 extend vertically or substantially vertically from the bottom plate 2 to the top plate 4.

Thus, the invention provides for applying to each mold 3 individually and independently a force specific to each of them. The latter tends to push each mold 3 in a distinct way from the lower plate 2, on which it is positioned, to the upper plate 4, so that the upper edges 33 are maintained into contact with the lower face 40. Therefore, the tightness between the top of the molds 3 and the plate 4 is guaranteed, limiting the dough overflows during fermentation and baking, and ensuring the good quality of the finished products.

According to a particular embodiment, said elastic restoring means 5 may comprise different restoring forces depending on the positioning of the mold 3 relative to the lower support plate 2. For example, the elastic restoring means 5 located at the periphery may have a force smaller than those located closer to the center, or vice-versa.

Furthermore, said elastic restoring means 5 can be designed adjustable, in order to increase or decrease their respective restoring force.

According to a first embodiment, shown in FIG. 3, said elastic restoring means 5 are in the form of at least one compression spring 6. In particular, each mold 3 is provided with at least one spring 6, preferably two springs 6. Each one is arranged between the lower support plate 2 and the bottom of the mold 3, so as to push each mold 3 upwards. Furthermore, each spring 6 can be made integral at its lower end with the lower plate 2.

According to a particular embodiment, said restoring means 5 can constitute a hinged connection, which then permits a vertical translational motion and oscillating motions of each mold 3 about at least one to three axes of pivoting.

According to another embodiment, shown in FIG. 4, said elastic restoring means 5 are in the form of at least one flexible blade 8 made of shape memory material. In particular, two blades 8 can be positioned under each mold 3, so as to push it upwards, according to the degrees of freedom mentioned above.

In the embodiment shown, each blade 8 has an overall S-shape. In particular, rods 9 can maintain the lower end 10 of each blade 8, making it integral with said lower support plate 2. The opposite end 11 is left free and bends when it is simply placed on top of a mold 3.

In addition, said device can comprise stops 7, arranged under each mold 3, preferably integral with the bottom of the latter, so as to limit the expansion stroke of the elastic restoring means 5.

More specifically, these stops 7 have a hook shape, so as to permit, on the one hand, the hooking of the rod 9 and thus ensuring retention in the presence of the upward thrust of the elastic restoring means 5 and, on the other hand, to insert a mold 3, through a slot, through which said rod 9 passes, by compressing the restoring means 5.

It should be noted that a same rod 9 can extend transversely or longitudinally, in order to connect and maintain the blades 8 of several molds 3 arranged in a row or a column, respectively.

Moreover, according to a preferred embodiment, not shown, said lower support plate 2 can comprise guides, extending vertically and protruding out of the upper face, so as to ensure the sliding of the molds 3 during the translational stroke in compression and inversely of the elastic restoring means 5.

In addition, according to the preferred embodiment, said springy restoring means 5 can include a hinged connection with each mold 3, in order to ensure at least one degree of freedom of movement of said mold 3. Preferably, this joint is located in the upper portion of said elastic restoring means 5 at the level of the junction with the bottom of said mold 3.

According to a particular embodiment, not shown, this joint can be in the form of a concave hemispherical cradle, within which a knee-joint type ball is mounted so as to freely pivot. Such a joint then provides said mold 3 with a freedom of oscillating according to three degrees of freedom.

According to yet another embodiment, shown in FIG. 5, said elastic restoring means 5 can be in the form of a single compression spring 6 arranged under each mold 3. In particular, each spring 6 has a straight shape, each of its windings having an identical cross-section, but can preferably also be conical, its largest diameter being located into contact with the lower plate 2, while its smallest diameter is into contact with the lower face of the bottom of the mold 3 it supports.

In addition, a stop can be arranged in the center of said spring 6, between the lower plate 2 and the bottom of the mold 3, limiting the stroke of the latter and thus its compression.

Advantageously, this spring 6 provides its mold 3 with a first degree of freedom according to a vertical translational motion, but also with two degrees of freedom of oscillation of the plane passing through the point or the area of resting of the top of said spring 6 on the bottom of the mold 3.

Being so hinged, the mold 3 can move alone and its contact with the upper plate 4 is automatically adjusted depending on the unevenness of its upper edges 33, improving the so created tightness.

Advantageously, according to an additional feature, said upper cover plate 4 has a mass, the weight of which is higher than the total sum of the forces of said elastic restoring means 5. In brief, the mere positioning of the upper plate 4, because of its weight, ensures the at least partial compression of all the elastic restoring means 5 of the device 1, so that all the upper edges 33 of all the molds 3 are pushed into contact with the lower face 40 of said plate 4.

It should be noted that in this configuration of mere positioning of the upper plate 4 on the molds 3 the plate 4 can comprise rims 41 that are provided projecting out of the lower face, in order to maintain it at its periphery relative to said molds 3 and, hence, to said device 1.

According to another embodiment, not shown, said device 1 comprises means for quick locking of said upper cover plate 4 with said lower support plate 2. Such locking means permit, on the one hand, to ensure the maintaining and locking of the two plates 2, 4 together and, on the other hand, to determine a locking distance between said plates 2, 4, so that the elastic restoring means 5 are compressed.

Moreover, these locking means can be positioned only on the periphery of the device 1, in particular in the form of so-called "quick" clips, closing through snapping-on, hooking, or a pair of screw and nut, or also a butterfly type screw. Thus, it is possible to lock and in particular to remove said upper plate 4 quickly and simply through locking means easy to be implemented and inexpensive.

Figure 6:
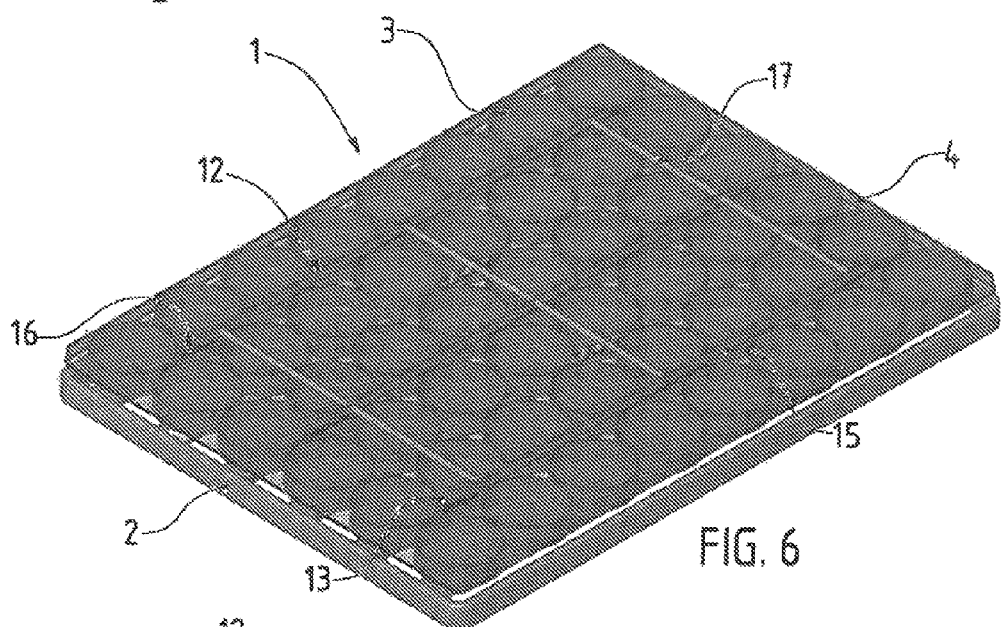
FIG. 6 shows a perspective view partially in transparency of a particular embodiment, showing the means for locking the covering plate.
Figure 7:
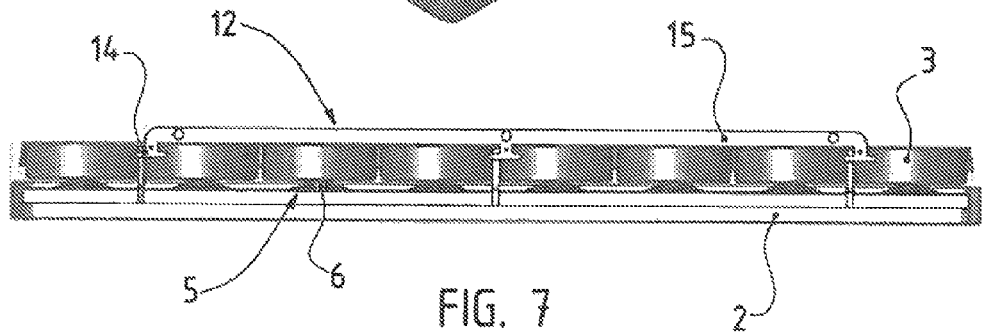
FIG. 7 shows a longitudinal cross-sectional view in a vertical plane of FIG. 6.

According to another embodiment, shown in FIGS. 6 and 7, said locking means can be in the form of hooking means 12 mounted at the level of the upper cover plate 4 of the molds 3. These means 12 are aimed at cooperating through hooking-in with arches 13 mounted on said lower plate 2, which project with respect to its upper face.

According to the preferred embodiment, said arches 13 can be constituted by a reversed U-shaped element, the free ends of which are fastened to the upper face of the lower plate 2. Moreover, these arches 13 can be arranged between the molds 3, in particular at the level of free spaces provided for between said molds 3 because of their shape.

To this end, preferably said hooking means 12 comprise at least one hook 14 designed movable so as to pass from a position of hooking-in on an arch 13, locking the upper plate 4 to the bottom plate 2, to a retracted position, unlocking the unit, and vice versa.

More specifically, this movability consists in a translational motion parallel to said upper plate 4.

It should be noted that each hook 14 can also comprise an opposite hook 140, which ensures the hooking and maintaining of the upper plate 4 in unlocked position. In brief, the opposite hook 140 forms a stop under the cover when positioning or removing the latter.

As shown in FIG. 6, said hooking means 12 are in the form of profile bars 15, on the lower face of which several hooks 14 are provided for. These profile bars 15 are applied against the upper face of the upper plate 4, slots 16 being provided for through the latter, in order to permit the passing through and the movement of said hooks 14. In particular, these slots 16 permit to guide the hooks 14 and the profile bars 15 during their movement from one to the other one of the locking positions.

Preferably, several profile bars 15 can be connected to each other transversely by connecting rods 17. The latter ensure an integral connection 15 of the various profile bars to each other and, therefore, their simultaneous displacement together.

Such hooking means 12 permit to maintain the plates 2 and 4 together, compressing their restoring means 5, but without effecting a locking complex to be implemented and to be released after baking.

Therefore, the support plate device 1 for bakery products or the like ensures a junction by contact and an individualized tightness between each mold 3 and the lower face 40 of the upper cover plate 4, through a restoring force, which is no longer global, but specific to each mold 3, permitting to locally counteract the deformation of the dough during fermentation and baking.

We claim:

1. Support plate device for baked goods, pastries, or and Viennese baked goods, the device comprising:
    at least one bottom plate;
    at least two molds supported by the bottom plate, each mold being comprised of a base and side walls with an upper rim;
    at least one top plate covering the molds, the top plate having a lower surface contacting said upper rim of each mold so as to form a sealed interior defined by said base, said lower surface, said side walls and said upper rim; and means for springy restoring each mold by a force pushing individually and independently each mold against the lower surface of the top plate, said means for springy restoring connecting to the bottom plate and each base of each mold.

2. Support plate device according to claim 1, wherein said means for springy restoring comprise a hinged connection with each mold, wherein at least one degree of freedom of movement of said mold is relative to the at least one bottom plate.

3. Support plate device according to claim 1, wherein said means for springy restoring is comprised of at least one compression spring.

4. Support plate device according to claim 1, wherein said means for springy restoring is comprised of at least one flexible blade of shape memory material.

5. Support plate device according to claim 1, wherein the at least one top plate has a mass with a weight at least higher than a total sum of restoring forces of said means for springy restoring.

6. Support plate device according to claim 1, further comprising: means for quick locking said at least one top plate with the at least one bottom plate.

* * * * *